Figure 1:
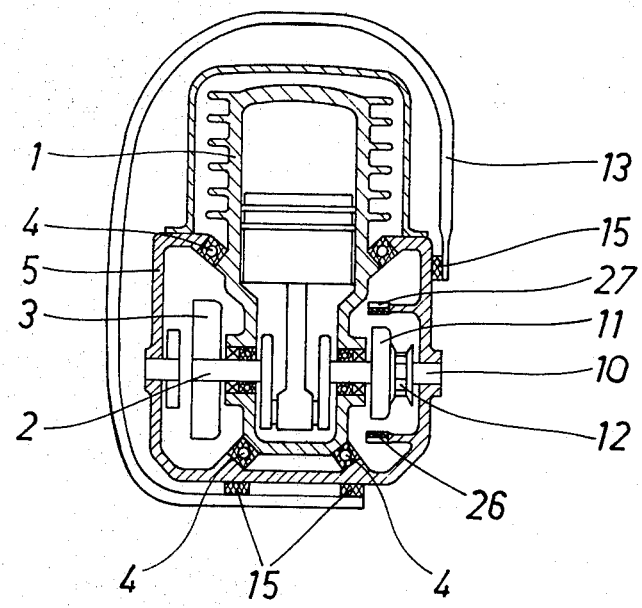

United States Patent [19]

Fogelholm

[11] 3,918,534
[45] Nov. 11, 1975

[54] SPECIAL CLUTCH FOR VIBRATION ISOLATED CHAIN SAWS

[76] Inventor: Carl-Magnus Fogelholm, Taysikuu 3 B 25, 02210 Ruomela, Finland

[22] Filed: Apr. 25, 1974

[21] Appl. No.: 464,248

[30] Foreign Application Priority Data
Apr. 26, 1974 Finland................................ 1334/74

[52] U.S. Cl................................ 173/162; 192/106.1
[51] Int. Cl.² ............................................. F16D 43/18
[58] Field of Search..... 173/162; 192/103 B, 105 A, 192/105 BA, 106.1; 83/788; 30/381

[56] References Cited
UNITED STATES PATENTS

| | | | |
|---|---|---|---|
| 2,283,325 | 5/1942 | Fawick | 192/105 BA |
| 2,852,117 | 9/1958 | Sproul | 192/105 BA |
| 2,987,158 | 6/1961 | Kiekhaefer | 192/105 BA |
| 3,224,473 | 12/1965 | Dobbertin et al. | 173/162 X |
| 3,367,464 | 2/1968 | Fullerton et al. | 192/105 BA |
| 3,565,224 | 2/1971 | Argereu | 192/105 BA |
| 3,675,750 | 7/1972 | Wright | 192/103 B |
| 3,680,608 | 8/1972 | Emmerich et al. | 173/162 X |
| 3,700,015 | 10/1972 | Kobayashi | 173/162 X |
| 3,785,465 | 1/1974 | Johansson | 192/105 BA |

Primary Examiner—Ernest R. Purser
Assistant Examiner—Richard E. Favreau
Attorney, Agent, or Firm—Burns, Doane, Swecker & Mathis

[57] ABSTRACT

A special clutch for chain saws in which the motor is mounted on vibration isolators and the clutch axle on which the chain wheel is mounted is driven from the crankshaft by both a centrifugal clutch and a spring clutch.

7 Claims, 8 Drawing Figures

SPECIAL CLUTCH FOR VIBRATION ISOLATED CHAIN SAWS

The invention relates to the special clutch for vibration isolated chain saws in which the motor has been isolated from the body by means of vibration isolators in which body the guide bar has been mounted by means of bolt mounting, and also the clutch axle on which the chain wheel has been attached with bearings. The chain wheel obtains transmission from the crank shaft by a centrifugal clutch and spring clutch, the handles of the chain saw being secured to the body.

The vibration isolation of most chain saws used today has been accomplished in such a manner that rubber vibration isolators have been mounted in between the body of the saw and the handles. It has been discovered, however, that vibration in the handles of such chain saws could not be sufficiently reduced with regard to the worker's health. this is partly because the vibration isolators which have the optimum softness from the point of view of vibration isolation cannot be used in the above described saw structures since the saw would thus simultaneously suffer a certain loss of maneuverability. The isolation result is also effected by the relation between "vibrating mass" and vibration "receiving mass," which is isolated from the former by the vibration isolators, and this relation is relatively unfavorable in the above saw structures due to the relatively light structure of the handles. A remarkable improvement with regard to this relation of masses has been accomplished in some previously known saw models in which only the motor and the guide bar secured to it have been isolated from the body which, among other things, comprises fuel and lubrication tanks, and to which also the handles have been secured. As the guide bar even in these models has nevertheless been secured directly to the motor, as in all saw models available in the market, the vibration isolators must be relatively stiff in order to maintain the maneuverability of the saw within the acceptable limits.

These drawbacks have, in principle, been avoided in the saw structures according to e.g. the German Patent publication No. 1,281,138 and the US publication No. 3,372,718. The vibration isolation of these saw structures is based on the fact that the motor has been isolated by still softer vibration isolators from the body to which fuel and lubrication tanks have been secured, and in which body the guide bar and the chain wheel with bearings have been mounted in such a manner that the rotary motion of the motor's crank shaft is transmitted to the above-mentioned chain wheel through the previously known clutch on one hand and through an extra spring clutch on the other. In the first place this principle makes it possible, thanks to the spring clutch, to choose vibration isolators of optimum softness for suspending the motor from the body without any loss of maneuverability of the saw. Secondly, the above-mentioned relation of masses is more favorable as compared to the generally used saws because the guide bar, the chain and the chain wheel, among others, are transferred from the "vibrating mass" i.e. the motor, to the "receiving mass" i.e. the body.

However, there are obvious drawbacks in the saw structures according to the above patent publications and it is the purpose of the special clutch according to the invention to avoid these drawbacks. In the saw structure according to the U.S. Patent publication No. 3,373,718 a gear has been used in transmission in addition to a centrifugal clutch and spring clutch and this would naturally increase the weight, price and maintenance costs of the saw as compared to regular saws. In the saw structure according to the German patent publication No. 1,281,138 the spring clutch has been placed beside the centrifugal clutch which leads to the consequence that the distance from the guide bar to the motor is substantially increased as compared to the saws that are used today. This has an unfavorable effect upon the torque between the center of gravity of the saw and the guide bar during the process of sawing, increases the weight of the saw, and gives the saw a rather awkward appearance.

The object of this invention is to make it possible to use particularly springy vibration isolators between the motor and the body of the saw without substantially changing either the shape of the saw or especially the location of the guide bar as compared to the saws used today which are insufficiently vibration isolated. This object shall be principally accomplished on the basis of the features of the invention presented herein.

Figure 2:
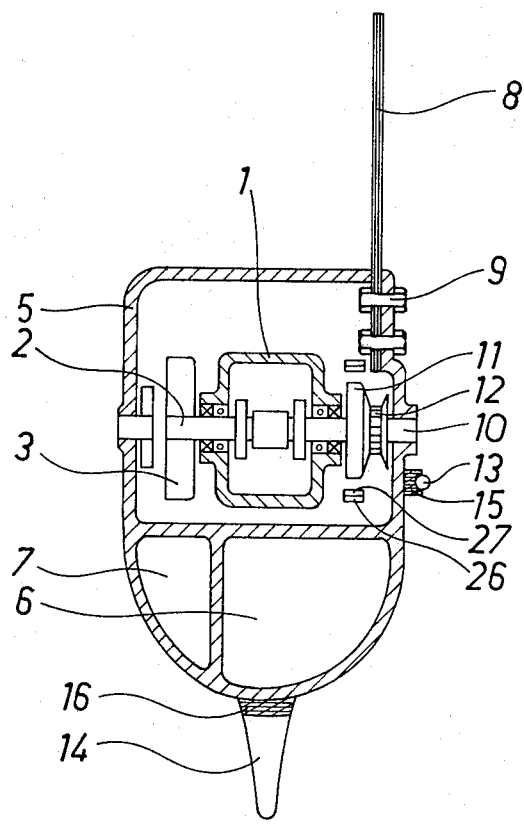

Various embodiments of the invention will be further explained in the following by referring to the accompanying drawings in which:

FIG. 1 shows partially in section, the chain saw according to the invention with its most important parts in the direction of guide bar, and FIG. 2 is a plan view, partially in section, of the saw shown in FIG. 1, FIGS. 3 – 7 show, partially in section, various embodiments of the special clutch according to the invention.

The motor 1, comprising the crank shaft 2 in one end of which has been mounted the combined flywheel and fan 3 with ignition system and starter assembly constructed inside the motor, has been isolated from the body 5 by means of vibration isolators 4. The location, number, shape and degree of softness i.e. spring standards (kg/mm) are chosen to be such that the optimum vibration isolation shall be obtained. The body 5 has been designed to comprise fuel and lubrication tanks 6 and 7. The guide bar 8 has been mounted in a stationary way in the body 5 and also the axle 10 has been mounted in the body 5 for the clutch 11 which is the object of the invention. The operative half of the clutch 11, to which clutch shoes are connected, has been mounted on the crank shaft 2. The other half, connected to the chain wheel 12, has been attached to the axel 10 with bearings. The clutch halves have been isolated from each other by one or more suitable springy means. In order to prevent the vibration in the body 5 from producing its whole effect upon the handles, both the front handle 13 and the rear handle 14 have been isolated from the body 5 by means of additional vibration isolators 15 and 16. In order to maintain the maneuverability of the saw the vibration isolators 15 and 16 must be relatively stiff.

The operation of the clutch 11 is characterized in that its acts both as a centrifugal clutch, as chain saw clutches in general, and also as a springy clutch, thus allowing the motor to vibrate as freely as possible on its own vibration isolators. It is essential from the point of view of the structure of the clutch 11 that the above-mentioned springy means which are used in connection with it, are located principally on the same radial plane as the clutch shoes which are meant for throwing the clutch on and off. Thus, the dimension of the clutch in the direction of the axle does not substantially vary from the corresponding measurements of centrifugal clutches of previously known chain saws. This is why the distance between the guide bar and the motor remains relatively small. In the embodiment shown in FIG. 4 the position of the guide bar is not altered at all as compared to regular saws.

FIGS. 3, 4, 5 and 6 show a few simplified embodiments the structure and operation of which shall appear in the following.

Figure 3:
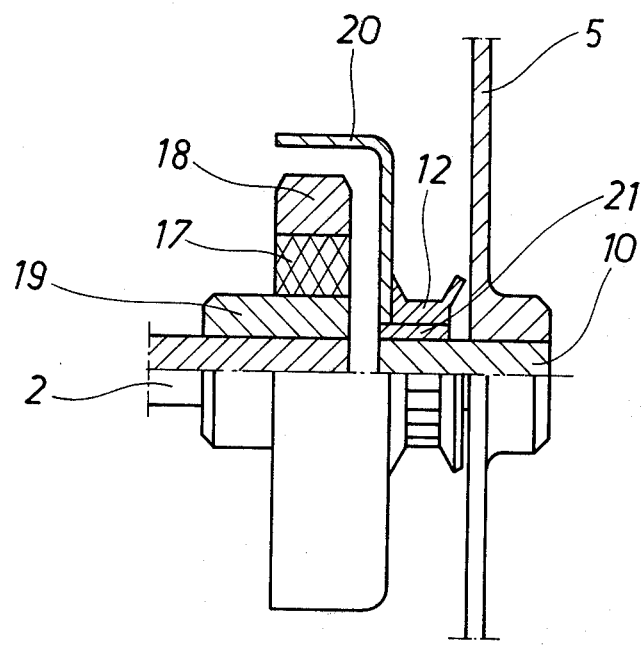
Figure 4:
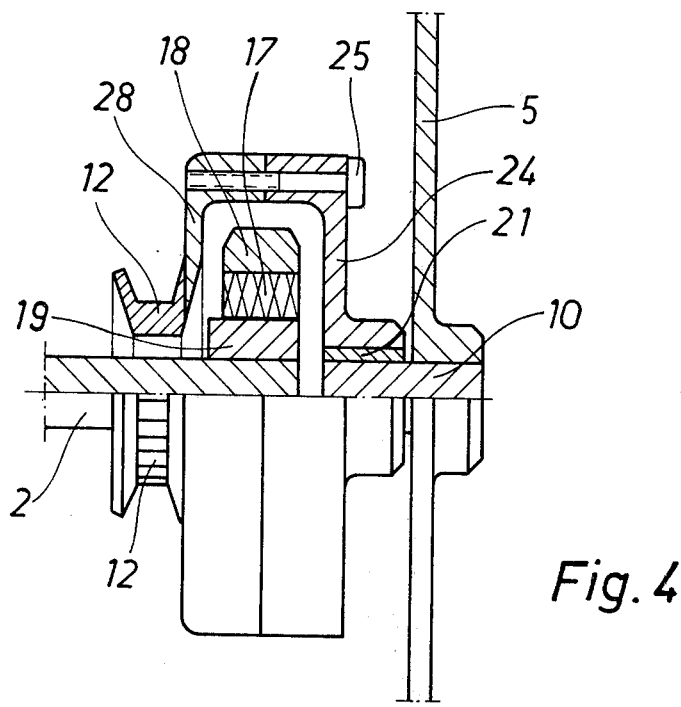

The operative half of the clutches presented in the FIGS. 3 and 4 comprises the clutch center 19 mounted on the crank shaft 2 and this clutch center 19, by means of one or more springy or resilient means 17 and by means of the clutch shoes 18, at the full speed of the motor, transmits rotary motion of the crank shaft to the other half of the clutch i.e. clutch drum (FIG. 3) or respectively to the drum halves 24 and 28 (FIG. 4) and through this to the chain wheel 12. The distance between the clutch shoes 18 and the clutch drum 20 or 24, 28 is at idle speed sufficiently great in order to prevent these parts from touching each other due to the vibration of the motor or anything else. As the number of revolutions increases up to a certain reading the springy means 17 give in and thus the clutch shoes 18 transmit the rotary motion of the crank shaft to the chain wheel 12 through the clutch drum. The clutch structure according to the FIG. 4 is favorable in the respect that the chain wheel 12 is located in between the motor 1 and the clutch 11, as in chain saws in general, and thus the location of the guide bar is favorable.

Figure 5:
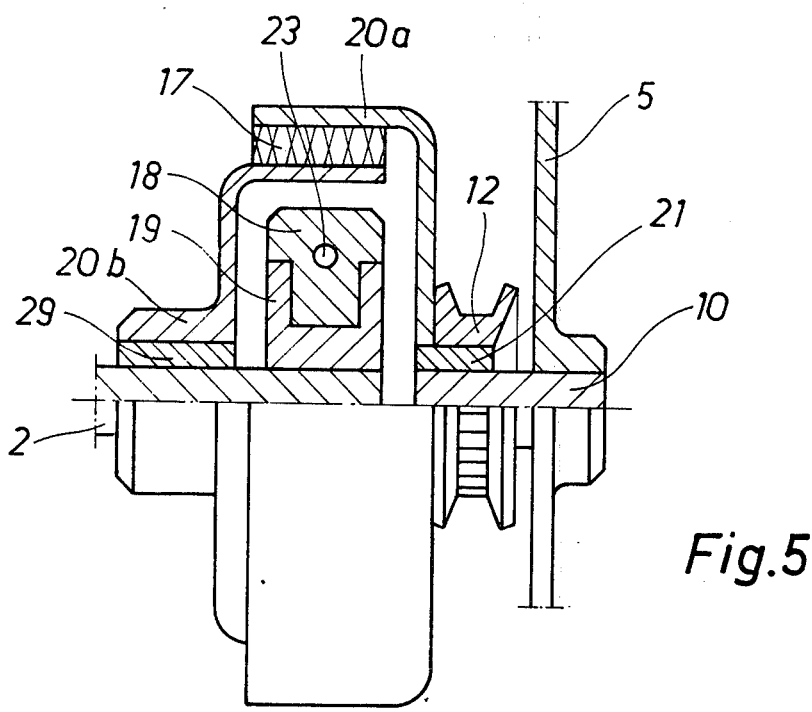
Figure 6:
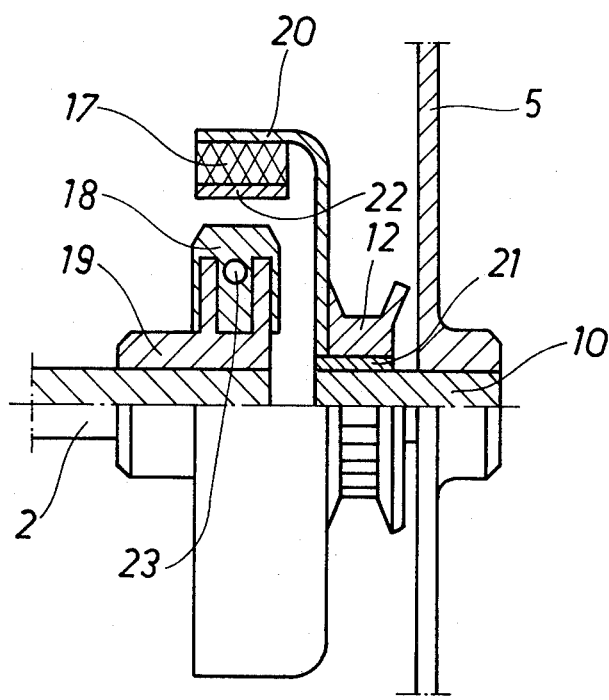
Figure 7A:
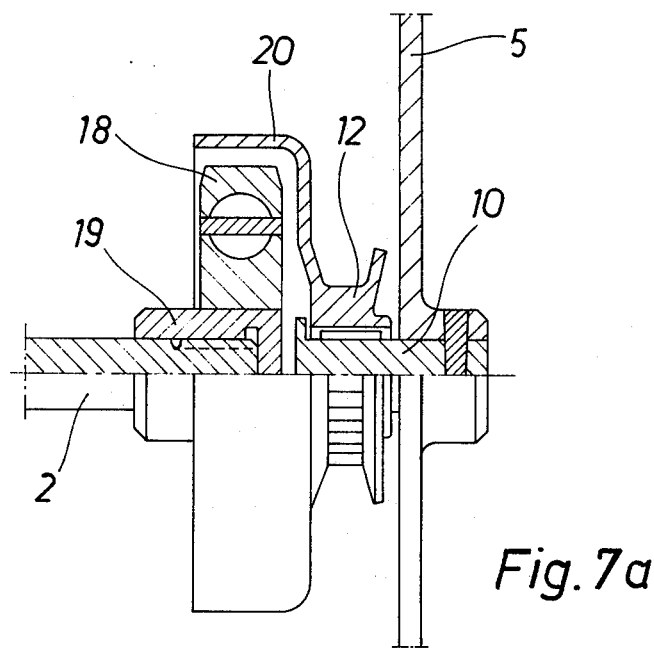
Figure 7B:
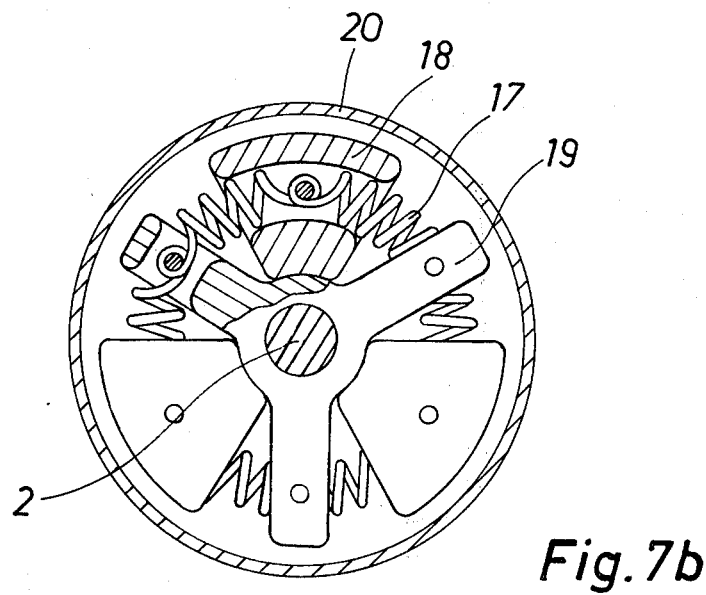

The clutch structures presented in the FIGS. 5 and 6 differ from the former in the respect that in these embodiments there have been used centrifugal clutch parts which are previously known in connection with chain saws as follows: the clutch bearing 29, clutch center 19, clutch shoes 18 and clutch spring 23 in the clutch according to the FIG. 5, and in the clutch according to FIG. 6 there are the clutch center 19, clutch shoes 18 and clutch spring 23. The other parts correspond principally to the parts presented in the FIGS. 3 and 4. The fact that one or more springy means are located outside the clutch shoes in between the clutch drum portions 20a and 20b or respectively in between 20 and 22 can be regarded as the main difference. One advantage, among others, obtained this way is that the structure of the springy means 17 can be weaker thanks to the longer torque. The same small distance between the clutch shoes 18 and the clutch drum 20b as in centrifugal clutches of regular saws can be used also in the clutch structure according to the FIG. 5 because of idle speed, since the vibration of the motor cannot, in this case, make the above-mentioned parts mesh with each other.

Either the structure of the clutch 11 or the springy means 17 used in connection with it have not been defined in detail in the former specification. Rubber can be used as springy means and, if this is impossible due to weather or other conditions, steel springs as in the structure according to the FIG. 7 can be used.

Another advantage which can be obtained by using the springy clutch according to the invention in the chain saw is, that it makes it possible to develop sufficiently fast and reliable chain brake. The purpose of the chain brakes is, as we know, to stop the movement of the chain in connection with kick backs. As the kick back in most cases takes place over a very short period of time, according to experimental examinations within 0.1 –0.2 sec., the chain brake must be very fast and reliable with regard to its operation. Most available chain brakes operate in such a manner that the brake moment is directed to the outer circle of the centrifugal clutch and stops the rotary motion of the clutch drum thus transmitting the brake moment to the crank shaft through the meshed clutch shoes of the clutch drum. Thus the number of revolutions of the motor is subject to decrease so quickly that the moving parts of the motor shall be subjected to great mechanical strains. The situation can be further described by the fact that for this very reason there is no chain brake in the market which would be sufficiently fast with regard to its operation. However, the springy means 17 inside the clutch 11 reduces these mechanical strains since the brake moment must be transmitted through it. FIGS. 1 and 2 present one chain brake structure in which the brake strap 26 or a corresponding brake shoe which acts upon the outer circle of the clutch 11 has been secured to the skid 27 which has been supported to the body 5 by means of a suitable attachment. The brake is released by previously known releasing mechanism.

I claim:

1. In a portable chain saw, a body, a motor resiliently supported in said body and including a drive shaft, a guide bar secured to said body, an axle supported in said body generally in alignment with said drive shaft and having an end in spaced relationship to an end of said drive shaft but subject to some misalignment, a chain wheel supported for rotation about the axis of said axle, and a centrifugal clutch comprising an inner portion mounted on said drive shaft for rotation thereby and radially expandable with increased speed of rotation, a drum portion rotatably supported from said axle in driving relation to said chain wheel and including a peripheral portion radially spaced from said first clutch portion to be drivingly engaged by said inner portion, and resilient means secured to one of said clutch portions in substantially the same radial plane as said inner portion and said peripheral portion of said drum portion to provide such resiliency in the connection of said centrifugal clutch portions during driving engagement therebetween as to result in the engagement being substantially continuous despite occurrence of misalignment between said drive shaft and said axle.

2. A portable chain saw as recited in claim 1, wherein said resilient means is secured to said drum portion of said centrifugal clutch.

3. A portable chain saw as recited in claim 1, wherein said drum portion of said centrifugal clutch includes a portion on one side of its said peripheral portion rotatably supported on said axle and a portion on the opposite side of its said peripheral portion secured to said chain wheel to support said chain wheel in a position substantially concentric with but spaced radially from said drive shaft.

4. In a portable chain saw, a body, a motor resiliently supported in said body and including a drive shaft, a guide bar secured to said body, an axle supported in said body generally in alignment with said drive shaft and having an end in spaced relation to an end of said shaft, and power transmitting means comprising an inner centrifugal clutch portion secured to said drive shaft for rotation therewith and radially expandable with increased speed of rotation, a clutch drum portion rotatably supported from said axle and including a peripheral portion spaced radially about said inner clutch portion, chain wheel means rotatable with said clutch drum portion, an intermediate means including at least a peripheral member of smaller diameter than said peripheral portion of said clutch drum portion, and means resiliently securing said peripheral member of said intermediate means to said peripheral member of said drum portion between it and said inner clutch portion, whereby said inner clutch portion will drivingly engage said peripheral member upon reaching a predetermined speed to resiliently drive said clutch drum portion.

5. A portable chain saw as defined in claim 4, wherein said intermediate means comprises a portion supported free for rotation on said drive shaft for supporting its said peripheral member.

6. In a portable chain saw, a body, a motor resiliently supported in said body and including a drive shaft, guide bar secured to said body, an axle supported in said body generally in alignment with said drive shaft and having an end in spaced relation to an end of said drive shaft, a chain wheel rotatably supported on said axle, and a centrifugal clutch comprising an inner clutch portion secured to said drive shaft for rotation therewith and radially expandable with increased speed of rotation, a first drum portion supported free for rotation on said drive shaft and having a peripheral portion adapted for engagement by said inner clutch portion upon its attaining a predetermined speed, a second drum portion secured in driving relation to said chain wheel and including a peripheral portion spaced radially from and outside of the peripheral portion of said first drum portion, and resilient means disposed between the peripheral portions of said drum portions to provide a resilient drive connection therebetween.

7. A portable chain saw as defined in claim 6, wherein a chain brake is supported on said body for operatively engaging said second drum portion upon occurrence of kick-back.

* * * * *